March 20, 1934.   R. H. GODDARD   1,951,404
FOCUSING MIRROR AND DIRECTING MECHANISM THEREFOR
Filed Dec. 10, 1930   6 Sheets-Sheet 1

March 20, 1934. R. H. GODDARD 1,951,404
FOCUSING MIRROR AND DIRECTING MECHANISM THEREFOR
Filed Dec. 10, 1930 6 Sheets-Sheet 2

Inventor
Robert H. Goddard
By Attorneys
Southgate, Fay & Hawley

March 20, 1934.  R. H. GODDARD  1,951,404
FOCUSING MIRROR AND DIRECTING MECHANISM THEREFOR
Filed Dec. 10, 1930  6 Sheets-Sheet 3

Fig. 7.

Inventor
Robert H. Goddard
By Attorneys

Witness
W. D. McKeon

March 20, 1934.    R. H. GODDARD    1,951,404
FOCUSING MIRROR AND DIRECTING MECHANISM THEREFOR
Filed Dec. 10, 1930    6 Sheets-Sheet 5

Inventor
Robert H. Goddard
By Attorneys
Southgate Fay & Hawley

Witness
W.D. McKeon

March 20, 1934.   R. H. GODDARD   1,951,404
FOCUSING MIRROR AND DIRECTING MECHANISM THEREFOR
Filed Dec. 10, 1930   6 Sheets-Sheet 6

Inventor
Robert H. Goddard
By Attorneys
Southgate Gay & Hawley

Witness
W. D. McKeon

Patented Mar. 20, 1934

1,951,404

UNITED STATES PATENT OFFICE 1,951,404

FOCUSING MIRROR AND DIRECTING MECHANISM THEREFOR

Robert H. Goddard, Worcester, Mass.

Application December 10, 1930, Serial No. 501,449

15 Claims. (Cl. 126—270)

This invention relates to a focusing mirror adapted for use in solar heating apparatus, and to mechanism for directing the mirror toward the sun.

It is one object of my invention to provide an improved mirror for such purposes so designed that a mirror of large size may be easily and economically constructed and that the curvature and focal length of the mirror may be readily adjusted to suit operating conditions.

Another object of my invention is to provide improved mechanism for directing the mirror toward the sun and for automatically maintaining the mirror in such adjustment.

To the accomplishment of this purpose, I provide means for correcting both vertical and horizontal deviations from the true direction. I also provide automatic means for resetting the mirror between the setting and the rising of the sun.

My invention further relates to arrangements and combinations of parts which will be hereinafter described and more particularly pointed out in the appended claims.

A preferred form of the invention is shown in the drawings, in which.

I will first describe the construction of the mirror system and will then describe the mechanism for directing the mirror toward the sun and for maintaining such adjustment during the daily travel of the sun.

Figures 1, 2, 3, 24:
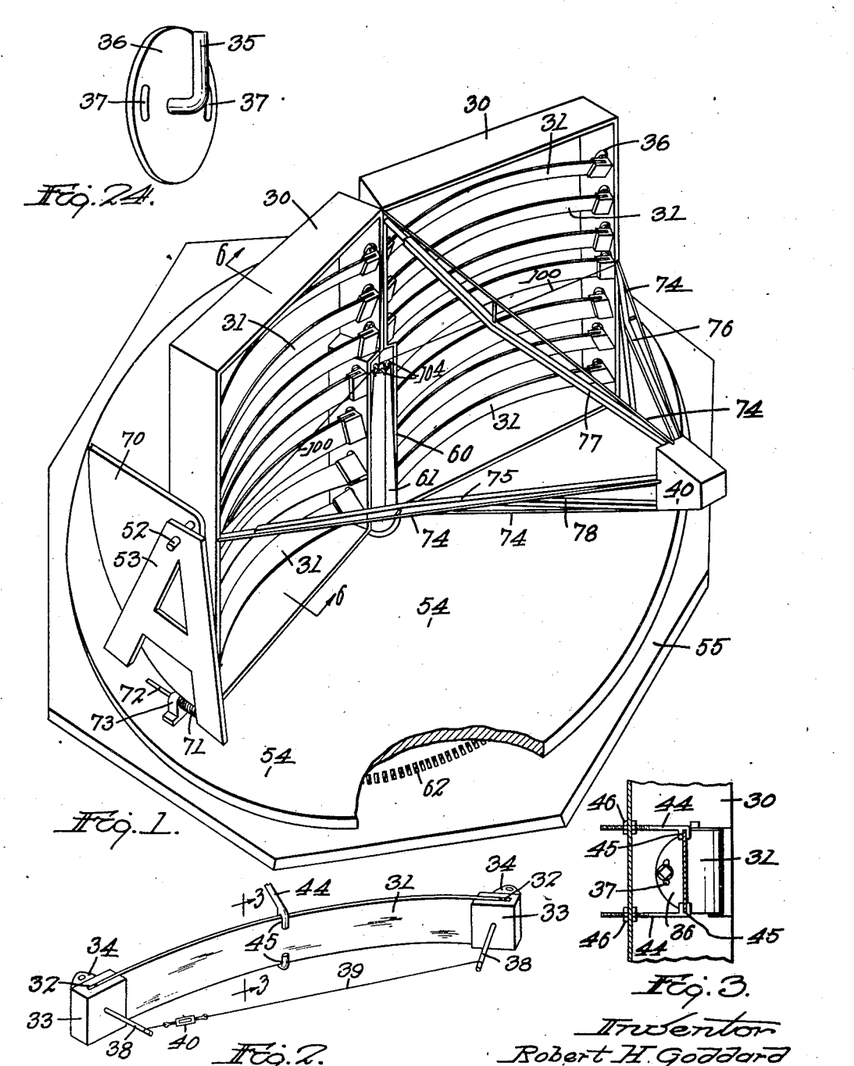
Fig. 1 is a perspective view of my improved mirror and parts of the directing apparatus.
Fig. 2 is a detail perspective view of one of the mirror strips and the means for adjusting the curvature thereof.
Fig. 3 is a detail sectional view, taken along the line 3—3 in Fig. 2.
Fig. 24 is a detail perspective view of a mirror-supporting element.

My improved mirror system comprises one or more casings 30, in each of which a plurality of mirror strips 31 are mounted. These strips 31 may be of relatively thin and suitably coated mirror glass or may be of polished or coated metal or of any other slightly resilient material. The ends of the strips 31 are loosely inserted in slots 32 in blocks 33 provided with ears 34 extending rearward therefrom and pivoted on studs 35 (Fig. 24). The studs 35 are secured in plates 36 mounted on the ends of the casings 30 and slotted at 37 to permit angular adjustment on the casing.

Each block 33 is provided with a forwardly projecting stud 38 and each pair of studs 38 is connected by a wire or cord 39 and a turn-buckle 40. By adjusting the turn-buckle 40, the length of the wire 39 may be increased or decreased, thus turning the blocks 33 on the pivot studs 35 and varying the curvature of the mirror strip 31. In this manner a curved mirror of any desired focal length and width may be easily and cheaply constructed.

Figure 6:
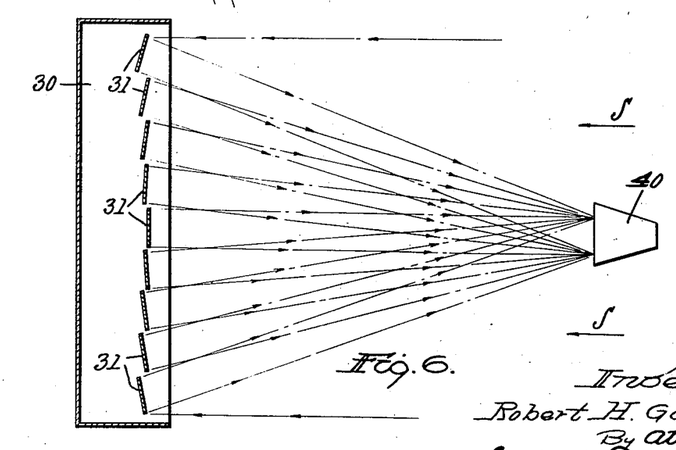
Fig. 6 is a sectional side elevation of the mirror system, taken along the line 6—6 in Fig. 1.

Preferably a plurality of such mirror strips 31 are mounted in superposed relation in each casing 30, as indicated in Fig. 6, and the plates 36 are adjusted at such relative angles that the reflected rays from all of the strips will be collected at a focus represented in Fig. 6 by a heat-absorber 40, which may be of any desired construction such as a water-heater, a heat engine or other suitable heat-absorbing device.

Figures 4, 5:
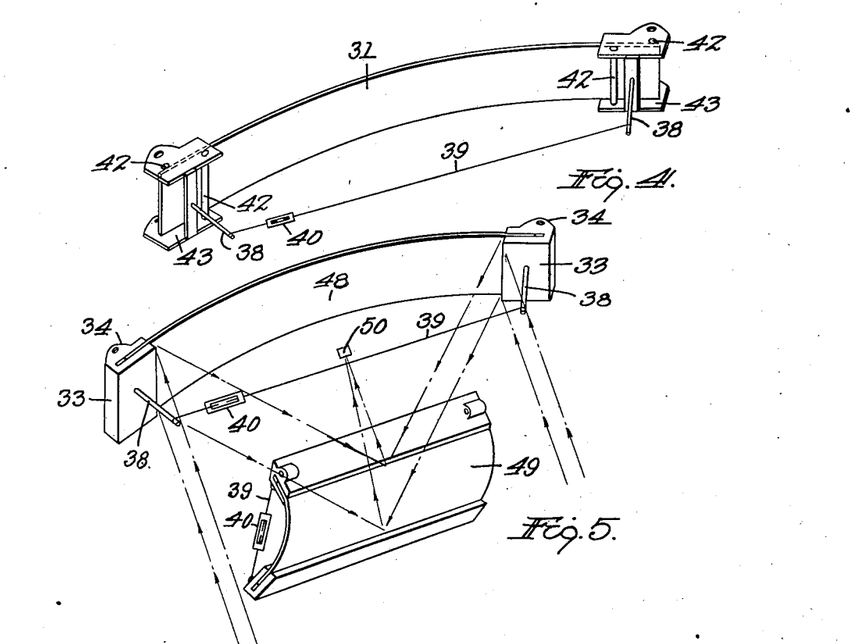
Fig. 4 is a perspective view showing a modified mounting for the mirror strips.
Fig. 5 is a perspective view showing a construction by which a double focusing effect may be attained.

In Fig. 4 I have shown a modified construction in which the mirror strip 31 is mounted between studs 42 in supporting blocks 43, the construction being the substantial equivalent of the slotted construction shown in Figs. 2 and 5.

Supporting studs 44 (Figs. 2 and 3) may be mounted in the back of the casing 30 engaging the mirror strips 31 between slotted end portions 45, thus affording additional support for the mirror strips at as many intermediate points as may be necessary. Each supporting stud 44 may be independently adjusted by clamping nuts 46.

Instead of providing a plurality of strips 31 inclined at different angles, as indicated in Fig. 6, I may provide the compound mirror construction shown in Fig. 5, in which mirror strips 48 and 49 of substantial area are mounted in opposed relations and in which provision is made for flexing the strip 48 in a horizontal plane and the strip 49 in a vertical plane.

The rays of light striking the mirror 48 are reflected to the mirror 49 substantially in line focus and are reflected by the mirror 49 to a point focus indicated at 50. For solar heating apparatus, however, the single mirror system indicated in Figs. 1 and 6 is preferred.

Directing apparatus

In solar heating apparatus, it is necessary that the mirror system should be constantly directed toward the sun and that progressive adjustment should be made to maintain such direction of the apparatus.

In order that my improved mirror system may be thus directed and adjusted, I mount the mirror casing or casings 30 on shafts 52 (Figs. 1 and 7) pivotally mounted in bearing brackets 53 which in turn are supported upon a turn-table 54. The table 54 is mounted to turn on a base 55 and is supported thereon by casters or similar anti-friction devices 56. Rolls 57 (Fig. 7) are pivotally mounted on angle bearing members 58 on the base 55 and overlie the turn-table 54, preventing lifting thereof by wind pressure or other forces.

The casings 30 are recessed in their lower middle portions, as indicated at 60 (Figs. 1 and 7), to provide clearance for a tubular post 61, mounted at the axis of the turn-table 54 for a purpose to be described.

Rack teeth 62 (Fig. 1) are formed in the base 55, preferably by cutting slots therein, and these rack teeth 62 are engaged by a cog-wheel or gear 64 (Fig. 7) mounted on one of the end bearing brackets 53.

A worm wheel 65 is secured to the cog-wheel or gear 64 and is engaged by a worm 66 on a worm shaft 67. When the worm shaft 67 is rotated in one direction or the other by adjusting mechanism to be described, the gear 64 will be rotated and will effect movement of the turn-table 54 relative to the base 55.

It is desirable not only to turn the mirror system in a horizontal plane, but also to tilt the mirror to any desired vertical angle. For this purpose I provide a gear segment 70 (Figs. 1 and 7) secured to one of the mirror casings 30 and provided with worm gear teeth engaged by a worm 71 mounted on a worm shaft 72 supported in bearing blocks 73 on the turn-table 54. When the worm shaft 72 is turned in one direction or the other by mechanism to be described, the mirror system will be tilted toward or away from the vertical axis of the turn-table 54.

Control members

The heat-absorbing device 40 is preferably supported upon spaced tie-rods 74 (Figs. 1 and 7), and one of a series of control members 75, 76, 77 and 78 is disposed inwardly adjacent each tie rod 74. The control members 75 and 76 control the direction of the apparatus in a horizontal plane and the control members 77 and 78 control the tilting or direction in a vertical plane.

The general construction of all of the control members is substantially the same, each member comprising an opaque and preferably metallic casing 80 (Fig. 9) having a window 81 of glass or other transparent material at the side thereof which is directed toward the axis of the mirror system.

Figures 8, 9, 10:
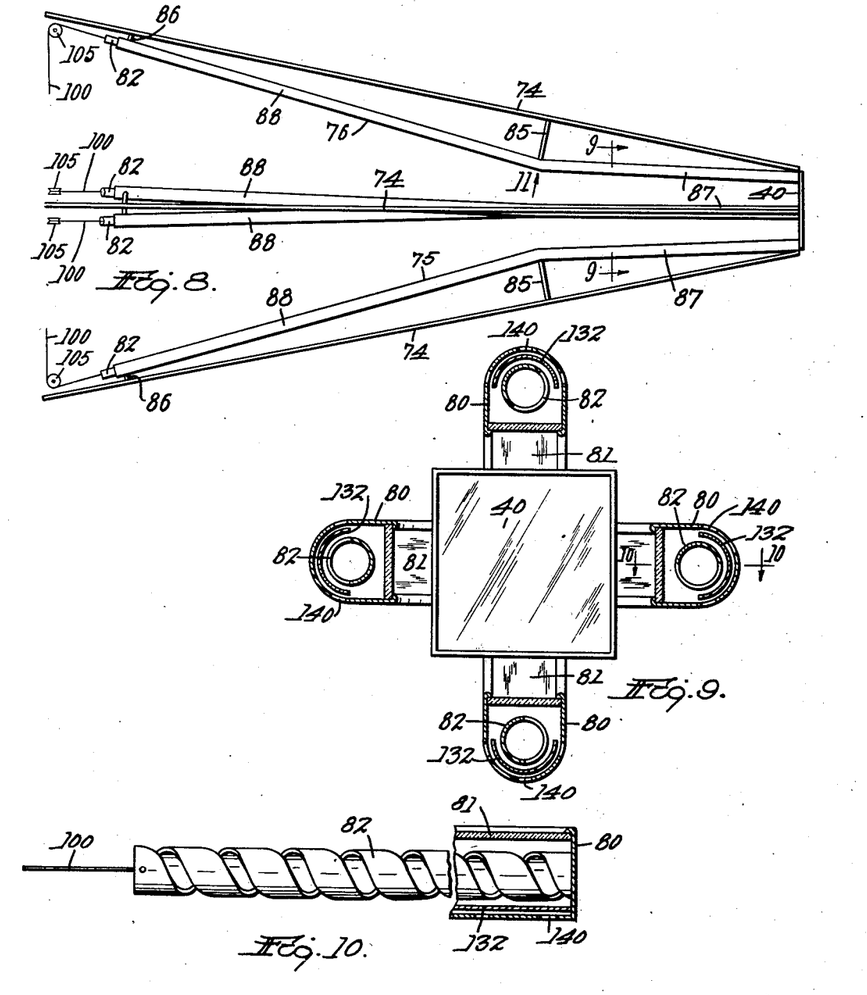
Fig. 8 is a side elevation of the direction-control members.
Fig. 9 is a sectional elevation of the control members, taken along the line 9—9 in Fig. 8.
Fig. 10 is a plan view of one of the thermostatic elements with the casing thereof shown in section, taken along the lines 10—10 in Fig. 9.

A thermostatic member 82 is mounted in each casing 80 and said member preferably comprises two strips of metal or other sheet material having different expansion characteristics and wound into the flattened spiral form indicated in Fig. 10. The two strips of material are so assembled and secured together that raising the temperature of the member 82 will cause the same to contract in length, whereas lowering the temperature will cause the member 82 to expand lengthwise. The members 82 are preferably blackened to increase their heat-absorbing qualities.

Each casing 80 is mounted on the corresponding supporting rod 74 and is spaced therefrom by struts 85 and 86, so that the portion 87 of the control member which is adjacent the heat-absorber 40 is inclined very slightly to the axis of the mirror system, whereas the portion 88 of each control member is inclined at a substantial angle to said axis. Furthermore, the portion 88 is displaced transversely out of the plane which passes through opposite supporting members 74. This displacement is necessary in order that the shadow of a supporting member 74 or of another control member cannot in any position coincide with one of the control members throughout its entire length. If the portion 87 is in shadow, the portion 88 will be free from the shadow by reason of its transverse displacement.

The portion 87 of the control member is inclined at a very slight angle to the axis of the mirror system in order that a relatively large portion of the element 82 will be exposed to the heat rays for a small deviation of the mirror system, as otherwise the controlling force would be very weak when the system was slightly out of focus, and accurate focusing would therefore not be possible.

Actuating connections

I will now describe the actuating connections through which expansion or contraction of the thermostatic members 82 is rendered effective to change the direction of the mirror system either vertically or horizontally. I will first describe the mechanism for effecting horizontal adjustment.

Figure 7:
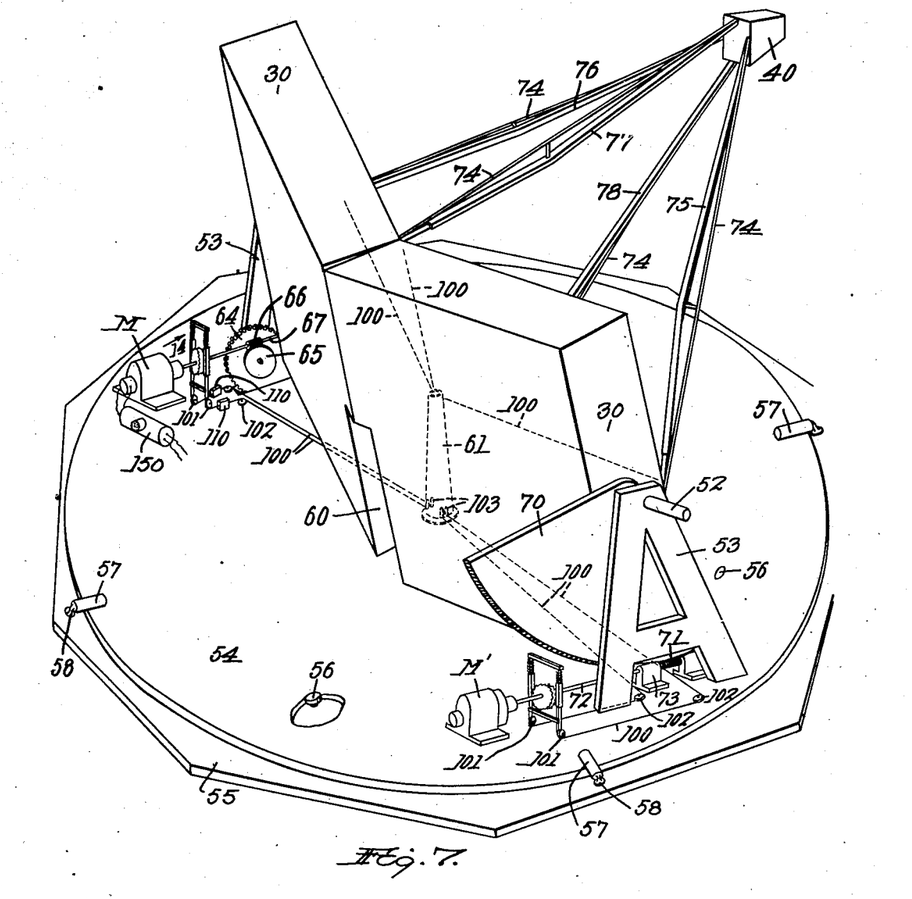
Fig. 7 is a perspective view of the apparatus, similar to Fig. 1 but looking in a different direction.
Figures 14, 15, 16, 17, 18, 19, 20, 21, 22, 23:
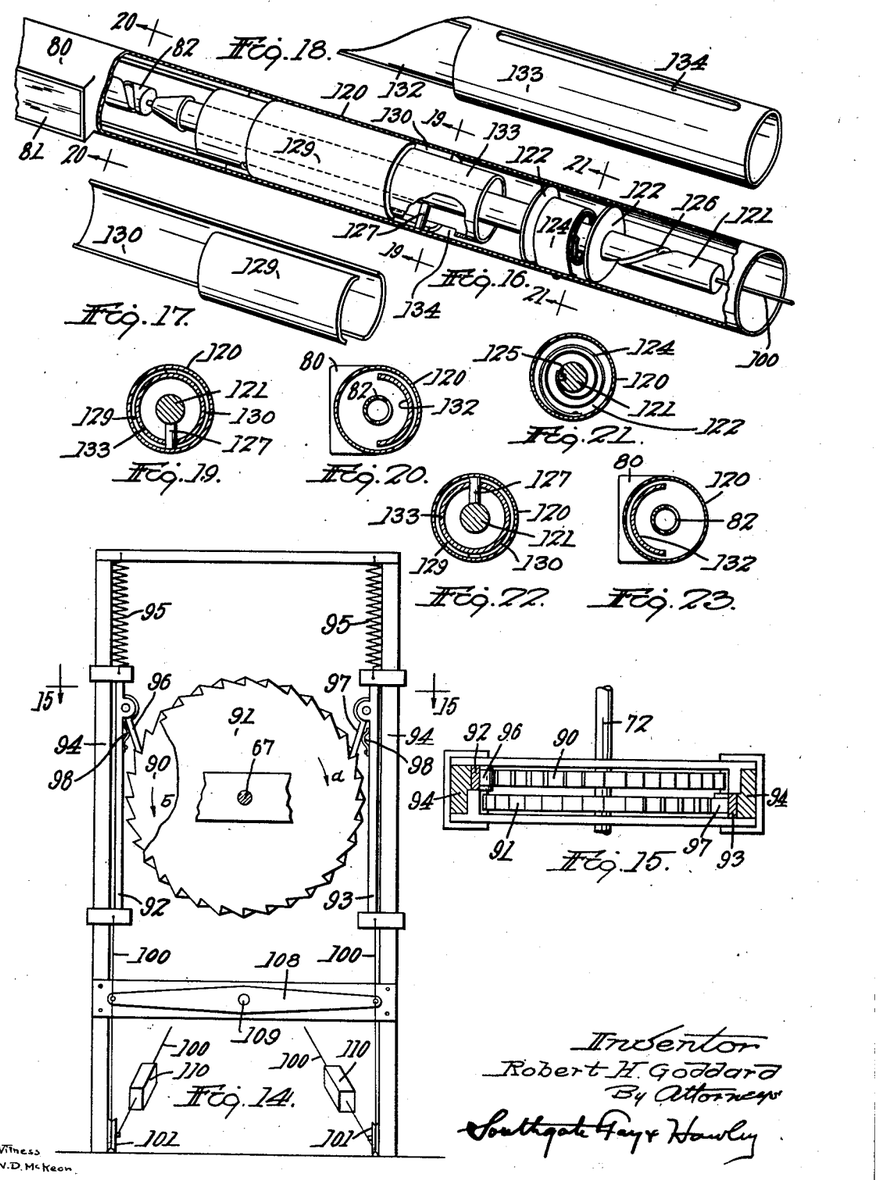
Fig. 14 is a side elevation of certain devices for actuating the direction mechanism, looking in the direction of the arrow 14 in Fig. 7.
Fig. 15 is a sectional plan view, taken along the line 15—15 in Fig. 14.
Fig. 16 is a perspective view, partly in section, of a part of the direction-control mechanism.
Figs. 17 and 18 are perspective views of certain segmental plates and a slotted sleeve to be hereinafter described.
Figs. 19, 20 and 21 are detail sectional views, taken along the lines 19—19, 20—20 and 21—21 respectively in Fig. 16.
Figs. 22 and 23 are sectional views similar to Figs. 19 and 20 but showing the parts in different positions.

Referring to Figs. 7 and 14, the worm shaft 67 is provided with ratchet wheels 90 and 91, the teeth of the two wheels being oppositely directed. Slides 92 and 93 are mounted on fixed posts or supports 94 and are yieldingly drawn upward by springs 95. The slide 92 pivotally supports a pawl 96 positioned to engage the teeth of the ratchet wheel 90 and the slide 93 pivotally supports a pawl 97 positioned to similarly engage the teeth of the ratchet wheel 91. Springs 98 move the pawls yieldingly to engaging position.

The slides 92 and 93 are pulled downward by wires 100 passing around guide pulleys 101 and 102 (Fig. 7) to additional guide pulleys 103 at the foot of the post or column 61 previously described.

The wires 100 pass upward through the column and around guide pulleys 104 (Fig. 1) at the top of the column, from which they extend laterally to and around guide pulleys 105 to the ends of the thermostatic members 82, to which they are firmly secured.

It will be evident that contraction of the thermostatic element 82 in the right hand control member 75 will be effective to draw downward the slide 93 (Fig. 14) and rotate the worm shaft 67 in the direction of the arrow $a$ (Fig. 14). Similarly, contraction of the thermostatic element 82 in the left hand control member 76 will move the slide 92 downward and will act through the pawl 96 and ratchet wheel 90 to rotate the worm shaft 67 in the direction of the arrow $b$ in Fig. 14.

A lever 108 (Fig. 14) is mounted on a fixed pivot 109 and is connected at its ends to the two wires 100. If both thermostatic elements 82 contract equally, due to a gradual change in temperature, the lever 108 will balance the pull of the two wires and no motion of the pawls 96 and 97 will take place. If, however, one only of the thermostatic elements contracts, while the temperature of the other remains unchanged, the lever 108 will be rocked to such an extent as to produce a feeding movement of one of the pawls 96 or 97.

Under ordinary conditions, the contractive pull of a thermostatic element 82 is sufficient to actuate the worm shaft 67 and thus adjust the direction of the mirror system. I have provided a relay construction, however, by which additional power may be rendered available when a very large or heavy mirror system is to be moved or when excessive wind-resistance is encountered.

Figure 13:
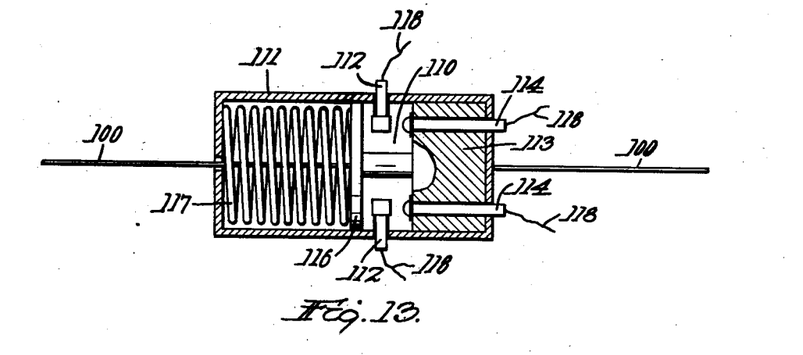
Fig. 13 is a sectional plan view of a connection to be described.

For this purpose I provide a reversible motor M connected to the shaft 67 and I provide a control device 110 (Figs. 13 and 14) in each pull wire 100. This control device comprises a casing 111 firmly connected to a section of the wire 100 and having insulated terminals 112 mounted in the side walls thereof. A piston 113 is slidable in the casing 111 and supports a second pair of insulated terminals 114. The piston 113 is provided with a head 116 spaced therefrom and connected to another section of the wire 100. A relatively strong spring 117 normally holds the piston 113 seated against the bottom of the casing 111, as shown in Fig. 13.

The pull of the wire 100 caused by contraction of a thermostatic element 82 is normally transmitted through the control device 110 and the pawl is moved directly by the thermostatic element. If abnormal resistance is encountered, the piston 113 is moved yieldingly in the casing 111 until the terminals 114 engage the terminals 112.

These terminals are connected through wires 118 to the motor M and contact of the terminals causes the motor to rotate in a given direction, thus rotating the worm shaft 67.

It will be understood that the right hand control device 110 in Fig. 14 causes rotation of the motor and worm shaft in one direction and the left hand control device in Fig. 14 causes rotation in the opposite direction. I am thus able to adjust the mirror system by power whenever the contractive force of a thermostatic element 82 is not sufficient to accomplish this result.

*Intermittent operation of thermostatic element*

I will now describe the construction by which a thermostatic element exposed to heat rays through incorrect direction of the apparatus is rendered effective to repeatedly actuate the associated ratchet mechanism until the desired correction of direction has been accomplished.

Referring to Figs. 16 to 23, I have shown a portion of a casing 80 provided with a window 81 and containing one of the thermostatic elements 82. The casing 80 is provided with a tubular casing extension 120, and a rod 121 is mounted to slide in bearing discs 122 therein.

The rod 121 is interposed between the end of the wire 100 and the end of the thermostatic member 82 and is preferably swivelled to the member 82. A flat coil spring 124 (Fig. 21) has its outer end secured to the casing extension 120 and at its inner end is provided with a stud 125 projecting into a helical groove 126 in the rod 121.

A stud 127 is fixed in the rod 121 and is slidable axially with the rod in one or the other of two slots, formed between the edges of segmental plates 129 and 130 fixed in the casing extension 120. As the thermostatic element 82 contracts, the rod 121 is moved axially to the left in Fig. 16. During this movement, the stud 127, being confined in one of the slots between the plates 129 and 130 (Fig. 17), prevents rotation of the rod 121 and consequently the helical groove 126 acts to move the stud 125 around the axis of the rod 121, thus displacing the spring 124 from normal free position and placing the spring under tension.

When the stud 127 reaches the left hand end of the shorter fixed segmental plate 129, the spring 124 is released and the rod 121 and stud 127 make a half revolution, until they engage the opposite edge of the longer segmental plate 130.

A shutter 132 (Fig. 18) is mounted in the casing 80 and is provided with a sleeve-like extension 133, loosely mounted within the segmental plates 129 and 130 and having a longitudinally extended slot 134 through which the stud 127 extends. Consequently any angular movement of the rod 121 and stud 127 is communicated directly to the sleeve 133 and to the shutter 132.

The half revolution of the rod and stud, taking place as previously described when the stud 127 reaches the left hand end of the segmental plate 129, causes the shutter 132 to be moved from the inoperative position shown in Figs. 9, 16 and 20 to the operative position shown in Fig. 23, in which position the window 81 is covered and the thermostatic element is protected from the heat rays entering through the window.

When thus protected, the thermostatic element will immediately cool and expand lengthwise, causing the stud 127 to move along the second slot 128 and placing the spring 124 under tension in the opposite direction. When the stud reaches the right hand end of the shorter segmental plate 129, the rod 121 is released and makes a half revolution in the opposite direction, thus opening the shutter 132. In this manner the thermostatic element 82 is alternately expanded and contracted so long as the heat rays enter the window 81, and at each successive contraction the pawl and ratchet mechanism is actuated to give the worm shaft 67 an additional turning movement, this intermittent operation continuing until the apparatus is accurately directed toward the source of heat.

In order that the cooling of the thermostatic element may take place quickly, I provide ventilating openings 140 (Fig. 9) in the portions of the casings 80 which are covered by the shutter 132 when in inoperative position. When the shutters are moved to cover the windows 81, the openings 140 are uncovered, permitting free circulation of air by which the heated element 82 is more quickly cooled.

Figure 11:
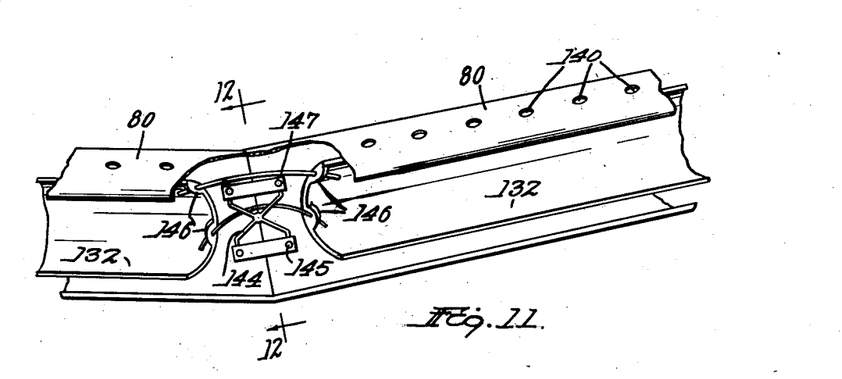
Fig. 11 is a detail view of the control casing, partially broken away, and looking in the direction of the arrow 11 in Fig. 8.
Figure 12:
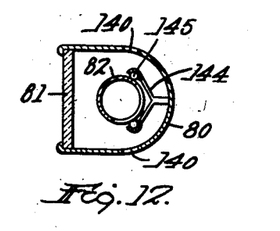
Fig. 12 is a detail sectional view, taken along the line 12—12 in Fig. 11.

In Figs. 11 and 12 I have indicated a construction by which I insure free sliding movement of each thermostatic element 82 around the joint or angle between the parts 87 and 88 (Fig. 8). At this joint or angle I provide a support 144 (Fig. 12) for a plurality of balls 145 by which free endwise movement of the thermostatic element 82 is facilitated.

In Fig. 11 I have also indicated a construction by which two portions of the shutter 132 may be operatively connected. For this purpose I provide the adjacent ends of the shutter portions with ears 146, and I provide wires 147 fixed in the ears of one portion and extending loosely through the ears of the other portion, these wires forming an operative connection through which one portion of the shutter 132 is effective to operate the other portion of the shutter.

By the mechanism thus described, the apparatus is adjusted at short intervals throughout the day so that the mirrors are accurately directed toward the sun at all times. It is necessary that the apparatus be returned approximately to sunrise position before operations can be resumed on the following day and for this purpose I preferably provide a clock-work controlled device 150 (Fig. 7) by which the motor M is started at a predetermined time, such as midnight, and is operated in such a direction as to return the mirror system to a position directed approximately toward the rising sun.

I have described in detail the mechanism for effecting horizontal adjustment of the mirror system. The mechanism for tilting the mirrors operates in substantially the same manner and through similar control devices, so that a detailed description of operation thereof is unnecessary. It will be understood that the tilting of the mirrors is effected by the upper and lower control members 77 and 78, and their action may be supplemented by a motor M'.

The worm gear drive of both adjusting mechanisms makes them self-locking and prevents accidental displacement of the apparatus by wind or other forces.

Having described the details of construction of my invention, it will be seen that I have provided an improved mirror construction, together with simple and effective mechanism for adjusting the mirror to direct the heat of the sun to a suitable heat-absorbing device, such as a boiler or heat engine, and that I have provided mechanism operative without manual attention to continuously direct the device toward the sun, making all necessary horizontal and vertical adjustments to effect this result.

Having thus described my invention and the advantages thereof, I do not wish to be limited to the details herein disclosed, otherwise than as set forth in the claims, but what I claim is:—

1. A mirror control apparatus comprising a focusing mirror, a support on which said mirror is mounted, means to direct the axis of said mirror to the sun, and a plurality of thermostatic elements directly operable on said means to adjust said mirror relative to said support and to thereby maintain alignment of said axis with the sun.

2. A mirror control apparatus comprising a focusing mirror, a support on which said mirror is mounted, means to direct the axis of said mirror to the sun, a plurality of thermostatic elements operable through said means to adjust said mirror relative to said support and to thereby maintain alignment of said axis with the sun, power mechanism for adjusting said mirror, and a control device by which said power mechanism is rendered operative when excessive resistance to mirror movement is encountered.

3. The combination in a mirror control apparatus as set forth in claim 2, in which said control device comprises tension connections between said thermostatic elements and said mirror-directing means, and a yieldable circuit-closer in said connections.

4. In a mirror control mechanism, a thermostatic element, a mirror adjusting mechanism directly operated thereby when the axis of said mirror is out of alignment with the sun and said element is exposed to solar heat rays, and means to intermittently shade said thermostatic element while thus exposed.

5. In a mirror control mechanism, a thermostatic element, a mirror adjusting mechanism directly operated thereby when the axis of said mirror is out of alignment with the sun and said element is exposed to solar heat rays, and means to cause alternate contraction and expansion of said element while thus exposed.

6. In a mirror control mechanism, a thermostatic element, a mirror-adjusting mechanism directly operated thereby when the axis of said mirror is out of alignment with the sun and said element is exposed to solar heat rays, and means to cause said element to intermittently and repeatedly operate said adjusting mechanism until alignment of said axis with the source of the heat rays is fully restored.

7. In a mirror control mechanism, a mirror-moving apparatus including a ratchet and pawl, a thermostatic element connected to actuate said pawl when said element is exposed to an increase in temperature, and means to intermittently shade said element from such exposure and to restore said element and pawl to their original positions, whereby intermittent repeated operations of said pawl are attained.

8. In a solar heat concentrating apparatus, a curved mirror, a heat-absorber at the focus thereof, mirror-adjusting mechanism, a plurality of thermostatic elements symmetrically disposed with respect to the focal axis of the mirror and having portions adjacent the path of the heat rays reflected from said mirror and disposed at a slight angle to said rays, and means controlled by said thermostatic elements effective to maintain the axis of said mirror directed toward the source of solar heat.

9. The combination in a solar heat concentrating apparatus as set forth in claim 8, in which said thermostatic elements have other portions disposed at greater angles to said reflected heat rays.

10. In a mirror control mechanism, a mirror-moving apparatus including a device to move said mirror in one direction when said device is exposed to an increase in temperature, a second device to move said mirror in the opposite direction when said second device is exposed to an increase in temperature, and means to prevent operation of either device when both of said devices are exposed to the same change in temperature.

11. In a mirror control mechanism, a thermostatic element, a shutter therefor, and means to automatically move said shutter alternately to successive operative and inoperative positions, such movements being effected by alternate shielding and exposure of said thermostatic element with respect to a source of solar heat.

12. The combination in mirror control mechanism as set forth in claim 11, in which the shutter-moving means includes a motor spring alternately flexed in opposite directions.

13. In a mirror control mechanism, a thermostatic element, a casing therefor having an open side exposed to solar heat, a shutter for said open side movably mounted in said casing, and means to effect successive movements of said shutter to operative and inoperative positions, said means being rendered intermittently operative by alternate shielding and exposure of said thermostatic element with respect to a source of solar heat.

14. The combination in a mirror control mechanism as set forth in claim 13, in which the thermostatic element and the casing therefor each comprise two parts bent out of direct alignment with each other in two different planes substantially perpendicular to each other.

15. The combination in a mirror control mechanism as set forth in claim 13, in which the thermostatic element and the casing therefor each comprise two parts bent out of direct alignment with each other in one plane and having bent end portions displaced transversely out of said plane.

ROBERT H. GODDARD.